C. Moore,
Fluid Meter.
No. 111,233. Patented Jan. 24, 1871.

2 Sheets. Sheet 1.

Witnesses
Fred. Haynes
R. J. Raeburn

Charles Moore

C. Moore,

Fluid Meter.

No. 111,233.  Patented Jan. 24, 1871.

Witnesses
Fred. Haynes
R. E. Rabeau

Charles Moore

UNITED STATES PATENT OFFICE.

CHARLES MOORE, OF NEW YORK, N. Y., ASSIGNOR TO WILLIAM TOBIN, OF SAME PLACE.

IMPROVEMENT IN FLUID-METERS.

Specification forming part of Letters Patent No. 111,233, dated January 24, 1871.

*To all whom it may concern:*

Be it known that I, CHARLES MOORE, of the city, county, and State of New York, have invented a new and useful Improvement in Fluid-Meters, of which the following is a full, clear, and exact description, reference being had to the accompanying drawing, forming part of this specification, and in which—

Figure 1:
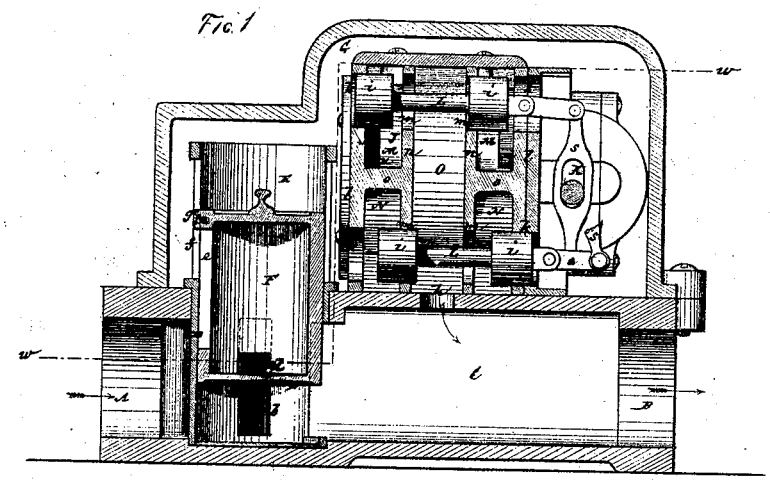
Figure 2:
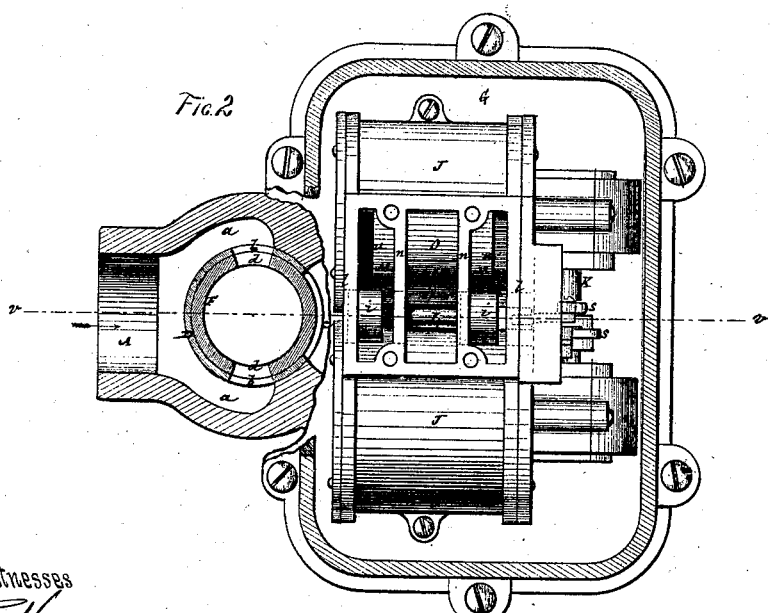
Figure 3:
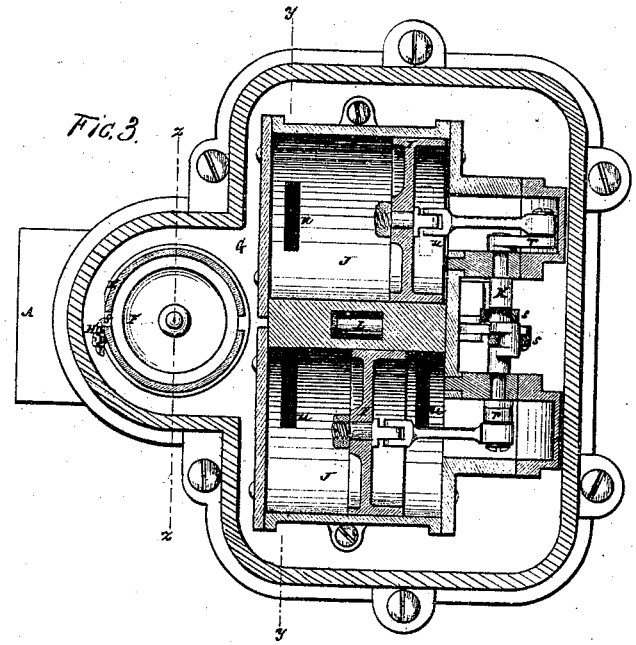
Figure 4:
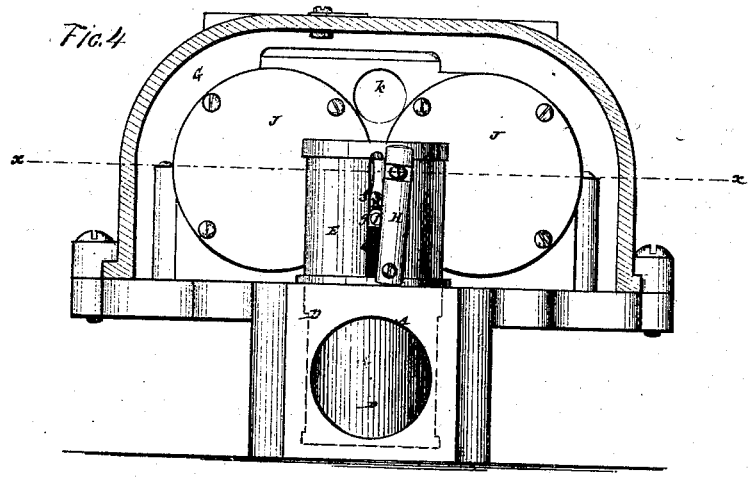
Figure 5:
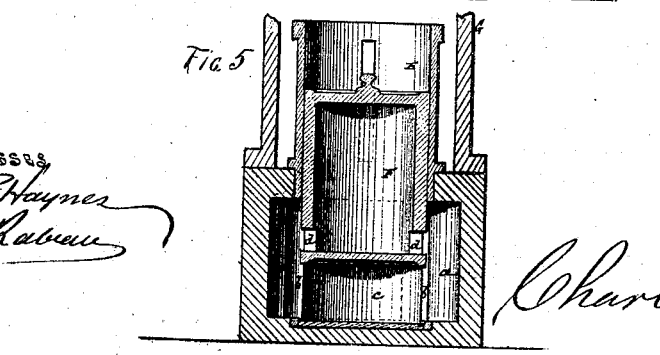

Figure 1 represents a central vertical section of my improved meter, said section being taken as indicated by the line $v\ v$ in Fig. 2, which is a horizontal section taken as denoted by the irregular line $w\ w$ in Fig. 1. Fig. 3 is a sectional plan in a plane as indicated by the line $x\ x$ in Fig. 4, which is a front view with the outer case in section, as denoted by the line $y\ y$ in Fig. 3. Fig. 5 is a vertical section through the line $z\ z$ in Fig. 3, in illustration of the differential-pressure or proportioning valve used in the meter.

Similar letters of reference indicate corresponding parts.

Although essentially differing in several important respects from the meter secured to me by Letters Patent of the United States No. 92,082, June 29, 1869, like it the meter herein described has for its object the employment of a given size motor or meter proper for variously-sized supply and delivery pipes, and whereby a small-sized meter may be applied to pipes of large dimensions by causing only a portion of the stream to pass through the meter, while the remainder of it passes in a direct manner to the outlet.

Said meter is applicable to measuring water, gas, and various liquids or fluids, but it will suffice here to describe it as used for the measuring of water.

The invention consists in a certain combination, with a motor that operates the registering mechanism and main pipe or outlet, of a valve operating by differential pressure as controlled by the draft, and so constructed or arranged that direct passage of the liquid to or through the main outlet is excluded till its passage is established to or through the meter, and a chamber or jacket from which said meter is supplied, and so that in proportion as the draft is increased or diminished is the supply to and through the meter, as well as in a direct manner to and through the main outlet, augmented or reduced, causing the diaphragm or pistons of the meter to move faster or slower in exact proportion to the draft. Such system or method of working insures an accuracy of measurement both of large or small quantities, and under light or heavy streams, at all pressures, which a fixed area of supply-opening to the motor or meter fails to effect.

The invention also includes a peculiar and advantageous construction of the proportioning-valve hereinbefore referred to, and in which the liquid, on its way to the meter, is made to pass through the valve.

The invention likewise embraces a peculiar construction of the valves used to control or reverse the motion of the moving diaphragms or pistons of the meter, in combination with a certain arrangement of parts and chambers or passages in relation with the cylinders, outer supply chamber or jacket, and branch or main outlet, and whereby an accurate, easy, and balanced action is obtained for said valves.

Referring to the accompanying drawing, A represents the main inlet, and B the main outlet, both of which may be of any required dimensions, or have large or small pipes attached to them, without regard to the size of motor or meter proper, or rather without restriction as to the meter being of a fixed or given size.

C is a through passage or chamber connecting the inlet A with the outlet B. D is a valve box or cylinder, preferably arranged to occupy a vertical position within the inlet A, or enlarged chamber in the rear thereof, as formed by side branches $a\ a$, said valve-box intercepting the inlet from the through-passage C, excepting when communication is established through side openings $b\ b$, and a back opening, $c$, made in the valve-box.

Arranged so as to be capable of close but easy up-and-down motion within the valve-box D and an upper extension or chamber, E, is a differential-pressure or proportioning valve, F, of cylindrical form when the valve-box D and chamber E are of such shape. This valve acts freely or independently, and serves to automatically proportion, as regulated by the draft, the supply to the meter, and in a direct manner to the through-passage C. The upper cylinder or chamber E, in which it works, is arranged within and open at its top to a water case or jacket, G, that surrounds and incloses the meter. Said valve F is made hollow, and closed top and bottom, but is formed with side openings *d d* at or near its bottom, facing the openings *b b* in the valve-box, and with a front, or it may be back, vertical opening, *e*, or both, opposite a vertical opening or openings, *f*, in the front or back, or both, of the cylindrical extension or chamber E, for which latter may be substituted, if desired, only a partial cylinder or upright guide or guiders provided with a slot, *f*.

The valve is guided in its up-and-down course by a projection, *g*, on the valve, fitted to slide within the openings *f*. Said valve, when fully down, is exposed to water from the inlet acting on the under face of its bottom, which is shelved or cut away opposite the openings *b b* for such purpose; but the opening *c* in rear of the valve-box is closed. Water from the inlet also is free to enter, and keep charged the interior of the valve, through the side openings *b b* and *d d*, both when the valve is down and in the course of its operation; but when down the opening *f* is closed by the valve.

When there is no draft on the outlet B, the pressure of the water in said outlet being the same as in the inlet, and equal, by or through a communicating outlet, *h*, from the meter, throughout the water-case G that incloses the meter, the valve F is balanced—or, rather, is kept down—simply by its own weight, or any superincumbent weight that may be added, independently of the pressure of the water, which is equal on its opposite faces, both top and bottom. When, however, draft is made upon the outlet B, the pressure is reduced in the passage C, and through the outlet *h* in the case G, which relieves the valve F of load, or produces a differential pressure that causes it to rise under the superior pressure of the water from the inlet on the valve, and accordingly as the draft is heavy or light will said valve be more or less raised.

The valve F, in rising, not merely uncovers or exposes the opening *c* to give a direct supply to the outlet B, but simultaneously establishes communication, by or through the openings *e* and *f*, to the case G, from which the meter draws its supply, and this uncovering of the opening *f* varies proportionately with the uncovering of the opening *c*, so that not only will any increase or diminution of the draft increase or diminish the area under exposure of the direct opening *c* to the main outlet, but also and proportionately, or thereabout, enlarge or contract the area under exposure or in communication with the case G of the openings *e* and *f*, which gives an increased or diminished supply to the meter, causing it to move faster or slower, and thereby, without the intervention, as a necessity, of varying mechanism, to cause the meter to register the quantity of water passing both through it and in a direct manner through the opening *c*, likewise leaving the valve F free of any mechanical connection with the registering devices.

It is an important element in this principle or system of action not only that the area of the supply-opening to the meter varies with variation of area under exposure in a direct course to the main outlet, but that the meter draws its supply from an outer case or chamber, which is kept charged with water under full pressure during all variations in area of the supply-opening as established by the valve, and that all the water passing to and through the meter or motor has first to enter said chamber.

To set or regulate the supply from the interior of the valve F to the case G, so that it shall bear a proper proportion to the supply as established by the direct opening *c*, I provide the opening *f* with an adjustable gate, H, that may be set as required to give greater or less width to the opening *f*. This may be done by pivoting the gate below and making it adjustable by a slot and set-screw from above, whereby, instead of the opening *f* being of uniform width throughout its length, it is made to gradually increase in width in an upward direction, so that when a heavy draft is being made and the valve is considerably raised there is a slight increase in the proportion of the supply to the meter relatively to the direct supply to the main outlet, which is believed to be advisable; but the gate H may, if desired, be made to give a different or uniform width to the opening *f* throughout its length.

The motor or meter proper may be variously constructed; but I prefer to employ a meter having two pistons, I I, working in horizontal cylinders J J, and communicating rotary motion, by cranks *r r*, to a shaft, K, that serves, through cranks on said shaft and slotted levers *s s*, or other suitable means, to operate the valves L L, which control and reverse the motions of the piston I I. Said shaft K may also serve to operate the registering mechanism, which is not here shown, and may be variously constructed and arranged.

The valves L L are shown as reciprocating slide-valves, the one arranged above and the other below, and each composed of two piston-heads, *i i*, that move through and within openings *k k k k* in fixed ends or heads *l l*, and through and within corresponding openings *m m m m* in intermediate partitions *n n*, that, in connection with other partitions, *o o*, serve to establish chambers M M, N N, and O, the one pair of chambers, M M, communicating, by ports *u u*, with the opposite ends of the one cylinder, and the other pair of corresponding chambers, N N, communicating, by similarly-arranged ports, with the opposite ends of the other cylinder, that lies by the side of the first one, and the chamber O communicating directly with the opening *h* to the through-passage C, that connects with the main outlet B.

By properly proportioning the lengths of the piston-heads $i\,i$ of the valves relatively to the fixed ends or heads $l\,l$, the partitions $n\,n$, and chambers M M, N N, and O, the water is admitted to and discharged from opposite ends of either cylinder J J alternately and in due course, to keep up a reciprocating action of the pistons I I, and during their entire operation the valves L L are exposed to a counter-balancing pressure or action of the fluid on their heads and around them, which secures for them a free-and-easy motion under all pressures of the working or passing fluid.

What is here claimed, and desired to be secured by Letters Patent, is—

1. The combination, with a direct course or passage for the liquid through the meter, and with a passage or chamber from which the motor draws its supply, of a free or independent differential-pressure valve operating to control both passages, essentially as herein set forth.

2. The construction and arrangement between the main inlet and main outlet of the differential-pressure or proportioning valve F, with a hollow body having one or more inlets, $d$, and one or more outlets, $e$, in combination with one or more fixed passages, $b$, $c$, and $f$, and with a fluid chamber or case, from which the motor draws its supply, and which is in communication, through the motor, with the main outlet, substantially as specified.

3. The combination, with the differential-pressure or proportioning valve F, of the adjustable gate H to or over the opening $f$, by which the motor or its case G is supplied with fluid through the valve, essentially as described.

4. The construction and arrangement, under exposure to the fluid in the outer case G and in the exhaust-chamber O, of the valve or valves L L, having piston-heads $i\,i$, with the openings $k\,k$ and $m\,m$, the chambers M M or N N and O, and cylinder-ports $u\,u$, substantially as specified.

CHARLES MOORE.

Witnesses:
FRED. HAYNES,
R. E. RABEAU.